United States Patent [19]

Davis

[11] 4,347,132
[45] Aug. 31, 1982

[54] REVERSE OSMOSIS EXPANSIBLE PRESSURIZED PERMEATE STORAGE HAVING PERMEATE AND CONCENTRATE CONTROLS

[75] Inventor: Stephen H. Davis, Dayton, Ohio

[73] Assignee: Water Refining Company, Inc., Middletown, Ohio

[21] Appl. No.: 235,221

[22] Filed: Feb. 17, 1981

[51] Int. Cl.³ .............................................. B01D 31/00
[52] U.S. Cl. .................................... 210/104; 210/116; 210/134; 210/257.2; 137/121; 137/505.41
[58] Field of Search ............... 210/103, 104, 109, 116, 210/134, 257.2, 321, 433.2; 137/121, 505, 41

[56] References Cited

U.S. PATENT DOCUMENTS

| | | | |
|---|---|---|---|
| 3,493,496 | 2/1970 | Bray et al. | 210/23 |
| 3,542,199 | 11/1970 | Bray et al. | 210/116 |
| 3,688,911 | 9/1972 | Baers | 210/321.1 |
| 3,856,676 | 12/1974 | Grimme, Jr. et al. | 210/321.1 X |
| 3,857,407 | 12/1974 | Olson | 137/505.41 |
| 3,957,638 | 5/1976 | in't Veld | 210/104 |
| 4,014,792 | 3/1977 | Gossett et al. | 210/257.2 X |
| 4,016,905 | 4/1977 | Marlatt, Sr. | 137/505.41 |
| 4,102,787 | 7/1978 | Geurtsen | 210/104 |
| 4,147,629 | 4/1979 | Geurtsen | 210/104 |
| 4,218,317 | 8/1980 | Kirschmann | 210/117 |

*Primary Examiner*—David R. Sadowski
*Attorney, Agent, or Firm*—Biebel, French & Nauman

[57] ABSTRACT

A water treatment and storage system includes a reverse osmosis treatment unit having an untreated water input line, a treated water output line and a bleed water output line. An expandable container, compressed by a spring arrangement, is provided for storing treated water. A container valve, connecting the reverse osmosis treatment unit and the expandable container, terminates the flow of treated water to the container when a predetermined quantity of water has been accumulated therein. The container valve further includes a bleed valve arrangement connecting the bleed water output line and a drain line. The bleed valve arrangement terminates the flow of bleed water to the drain line after the container has accumulated the predetermined quantity of treated water.

32 Claims, 5 Drawing Figures

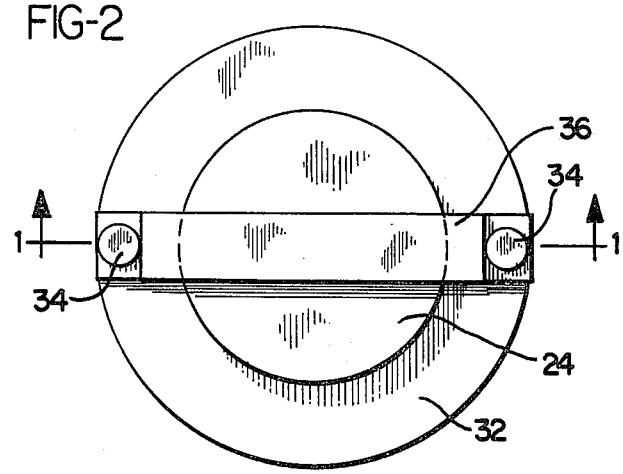
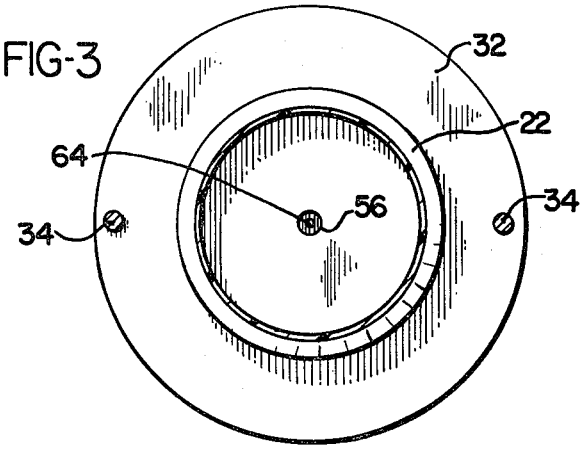
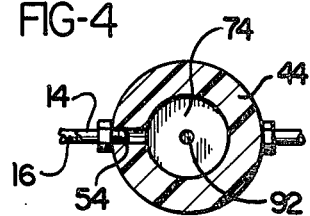
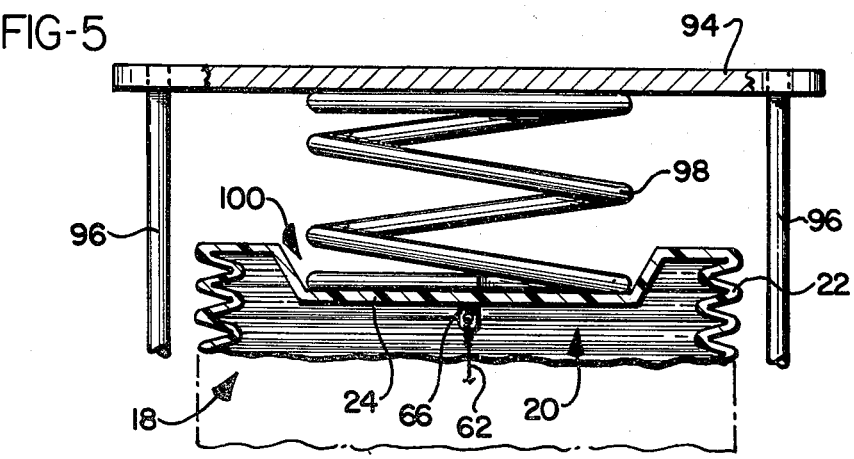

REVERSE OSMOSIS EXPANSIBLE PRESSURIZED PERMEATE STORAGE HAVING PERMEATE AND CONCENTRATE CONTROLS

The present invention relates to a water treatment and storage system and, more particularly, to such a system in which treated water is temporarily stored under pressure and available for use in a residence.

A number of water treatment systems have been developed in which salts and contaminant solids are removed by a reverse osmosis treatment unit. One such reverse osmosis treatment unit is disclosed in U.S. Pat. No. 3,493,496, issued Feb. 3, 1970, to Bray et al. In the Bray et al unit, untreated water passes through a semi-permeable reverse osmosis membrane and is removed via a treated water output line. A portion of the untreated water supplied to the treatment unit does not pass through the membrane but, rather, passes out of the unit through a bleed water output line, carrying with it a substantial portion of the salts and contaminant solid particles which previously entered the unit in the untreated water. Typically, this bleed water output line is connected to a drain.

The amount of treated water needed for use in a typical residence can be readily provided by a relatively small reverse osmosis unit which produces treated water at a low rate. The treated water is temporarily stored in a storage tank. A quantity of treated water is accumulated which is sufficient to meet the sporadic usage requirements of the household. Frequently, the storage tank is connected to an additional faucet on the kitchen sink. The treated water may be used for drinking water and for other purposes, such as in a steam iron.

It will be appreciated that if the storage tank for the treated water is mounted at a level below the faucet to which it is connected, it will be necessary to provide an arrangement by which the water is stored under pressure in the storage tank. Alternatively, a separate pump may be utilized to pump water from the storage tank to the faucet. Providing a pump for supplying treated water to a faucet is somewhat undesirable, however, in that it adds appreciably to the expense of the overall treatment system.

The Bray et al '496 patent, noted above, discloses a storage tank connected to receive treated water from a reverse osmosis treatment unit and to provide the stored water to a faucet or similar dispensing unit. In a first embodiment, the storage tank includes a flexible rubber diaphragm which divides the tank into two compartments. Treated water is supplied to one compartment and pressurized air is supplied to the other compartment on the opposite side of the diaphragm. A pressure relief valve is connected to the storage tank output such that when the tank pressure exceeds the pressure setting of the valve, the treated water is directed to a drain.

In a second embodiment disclosed in the Bray et al '496 patent, untreated water is supplied to a tank compartment in place of the pressurized air used in the first embodiment. A pressure regulation valve arrangement is provided for controlling the pressure of the untreated water within the storage tank and thereby controlling the pressure of the treated water as well.

The storage tank arrangements of the Bray et al '496 patent are somewhat disadvantageous in that treated water is directed to a drain through a relief valve after the pressure within the storage tank exceeds a specified pressure level. When treated water has not been drawn from the storage tank in some time and the tank has been filled to its capacity, this results in a continuous flow of subsequently treated water to the drain, producing a significant wastage of water. Additionally, the use of a large rubber diaphragm within a rigid tank is somewhat disadvantageous in that the diaphragm may tend to crack after an extended period of use. Furthermore, the bleed line from the reverse osmosis unit is continuously connected to a drain, with the result that an additional quantity of water is wasted. Finally, in the embodiment of Bray et al in which air is provided on one side of the flexible diaphragm in the storage tank, it is necessary to provide a tank which has a capacity of from 20% to 300% larger than the volume of stored treated water in order to maintain stored water at a pressure less than the relief valve setting. As a consequence, the storage tank arrangement of Bray et al is undesirably large and also relatively expensive.

U.S. Pat. No. 3,542,199, issued Nov. 24, 1970, discloses a reverse osmosis water purifying device including a water storage tank connected to a relief valve within the purification unit, which valve controls the pressure within the storage tank. The tank is constructed in a manner similar to that disclosed in the Bray et al '496 patent noted above in that it includes a rubber diaphragm having pressurized air supplied to one side of the diaphragm, with the treated water being collected in the tank on the other side of the diaphragm. The Bray et al '199 system is limited in the same respects mentioned above with regard to the Bray et al '497 system.

Accordingly, it is seen that there is a need for a simple, inexpensive storage arrangement for use in a reverse osmosis water treatment system which arrangement maintains treated water under pressure and available for use in a household and in which the flow of water through the reverse osmosis treatment unit is controlled to reduce wastage.

SUMMARY OF THE INVENTION

A water treatment and storage system includes a reverse osmosis treatment unit having an untreated water input line, a treated water output line and a bleed water output line. An expandable container means defines an expandable storage chamber for storing treated water. A container valve means connects the storage chamber to the treated water output line of the reverse osmosis treatment unit and permits the flow of treated water to the storage chamber when less than a predetermined quantity of treated water is stored in the storage chamber. The container valve means terminates the flow of treated water to the storage chamber when the predetermined quantity of treated water is stored therein. A pressure spring means is provided for applying a spring force to the expandable container means to maintain the stored treated water in the storage chamber under pressure.

The container valve means may further comprise means defining a container outlet for permitting uninterrupted flow of treated water from the expandable container means to a treated water distribution line.

The container valve means may include a valve body defining a treated water valve chamber; a treated water valve inlet communicating between the treated water valve chamber and the water output line of the reverse osmosis treatment unit; and a treated water valve outlet communicating between the treated water valve chamber and the expandable storage chamber. The treated water valve chamber defines a valve seat surrounding the treated water valve outlet. The container valve means may further include a valve head means positioned in the treated water valve chamber and movable from a first position, in which the valve head means contacts the valve seat to prevent flow from the treated water inlet to the treated water outlet, to a second position, in which the valve head means permits flow from the treated water inlet to the treated water outlet. Finally, the container valve means may include linkage means, connecting the valve head means and the expandable container means, for moving the valve head means from the second position into the first position when the predetermined quantity of treated water is stored in the storage chamber, whereby further flow of treated water to the storage chamber is terminated.

The valve body may further define a container outlet communicating between the treated water valve outlet and a treated water distribution line, whereby uninterrupted flow from the expandable container means to the distribution line is provided.

The valve head means may comprise a seat contacting portion for contacting the valve seat when the valve head means is in the first position. The container valve means may also comprise valve spring means for urging the valve head means toward the second position, whereby the seat contacting portion is held away from the valve seat when less than the predetermined quantity of treated water is stored in the storage chamber. The valve head means may further include a plurality of feet extending from the seat contacting portion on the side thereof opposite the valve seat, for contacting the wall of the treated water valve chamber and limiting movement of the valve head means away from the valve seat. The linkage means may include a wire connected to the valve head means and to the expandable container means such that the seat contacting portion is moved into contact with the valve seat against the opposing force of the valve spring means when the expandable container means has received the predetermined quantity of treated water in the storage chamber. The valve head means may further include a valve stem portion which extends into the treated water valve inlet and is connected to the wire.

The expandable container means may comprise an expandable bellows connected to the valve body and a substantially rigid plate, to which the wire is attached, extending across the bellows at the end thereof opposite the treated water valve outlet.

The spring means may include a support plate secured to the chamber valve means and a pair of spring guide rods mounted on the support plate on opposite sides of the expandable container means. The spring means may further include a pressure bar slidably mounted on the spring guide rods and contacting the side of the expandable container means opposite the container valve means. Additionally, the spring means may include a pair of compression springs. Each of the compression springs is mounted on an associated one of the spring guide rods on the side of the pressure bar opposite the expandable container means. The compression springs urge the pressure bar against the expandable container means to maintain the stored treated water in the storage chamber under pressure.

The container valve means may further include bleed valve means, connecting the bleed water output line of the reverse osmosis treatment unit to a drain. The bleed valve means permits flow of bleed water from the unit to the drain line when less than the predetermined quantity of treated water is stored in the storage chamber and terminates the flow of bleed water from the unit to the drain line when the predetermined quantity of water is stored in the storage chamber.

The valve body may further define a bleed water valve chamber, a bleed water valve inlet communicating between the bleed water valve chamber and the bleed water output line of the reverse osmosis treatment unit, and a bleed water valve outlet communicating between the bleed water valve chamber and a drain line. A bleed valve closure means is provided in the bleed water valve chamber for terminating flow of bleed water from the bleed water output line of the reverse osmosis unit to the drain line when the predetermined quantity of treated water is stored in the storage chamber.

The bleed valve closure means may comprise a flexible diaphragm in the bleed water valve chamber, dividing the bleed water valve chamber into a first chamber portion communicating with the bleed water valve inlet and the bleed water valve outlet and a second chamber portion. The diaphragm is movable into contact with the bleed water valve inlet so as to terminate flow of bleed water from the bleed water valve inlet into the first chamber portion of the bleed water valve chamber. The valve body may further define an opening extending between the treated water valve chamber and the second chamber portion of the bleed water valve chamber, whereby the increase in pressure in the treated water valve chamber upon movement of the valve head means into the first position produces movement of the diaphragm into contact with the bleed water valve inlet.

Accordingly, it is an object of the present invention to provide a water treatment and storage system, including a reverse osmosis treatment unit in which an expandable container stores treated water from the treatment unit under pressure provided by a spring arrangement cooperating with the expandable container; to provide such a system in which a container valve connects the treatment unit to the expandable container and terminates the flow of treated water to the container after a predetermined quantity of water has been accumulated therein; to provide such a system in which the container valve additionally connects the bleed water output line of the reverse osmosis treatment unit to a drain line and in which flow of bleed water to the drain line is terminated after a predetermined quantity of treated water has been accumulated in the container; to provide such a system in which a valve linkage arrangement interconnects the container and the container valve for closing the valve upon accumulation of the predetermined quantity of treated water in the container; and, to provide such a container valve including a bleed valve arrangement for terminating the flow of bleed water from the reverse osmosis treatment unit when closure of the container valve produces an increase in pressure of the treated water provided by the reverse osmosis treatment unit.

Other objects and advantages of the invention will be apparent from the following description, the accompanying drawings and the appended claims.

BRIEF DESCRIPTION OF THE DRAWINGS

FIG. 2 is a plan elevation view taken generally along line 2—2 in FIG. 1;

FIG. 3 is a sectional view taken generally along line 3—3 in FIG. 1;

FIG. 4 is a sectional view taken generally along line 4—4 in FIG. 1; and

FIG. 5 is a partial side view in section, similar to FIG. 1, showing an alternative pressure spring means.

DETAILED DESCRIPTION OF THE PREFERRED EMBODIMENT

Figure 1:
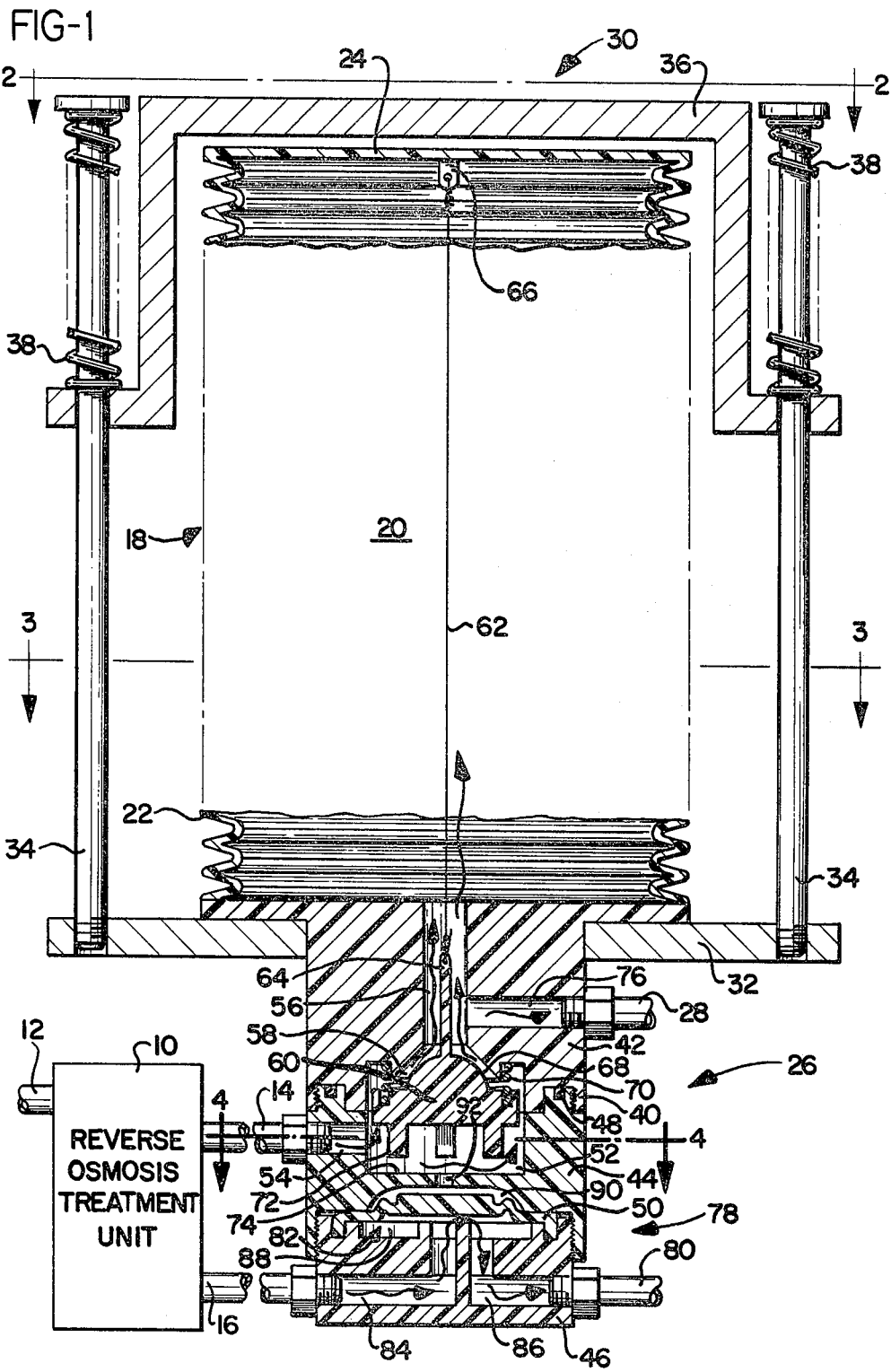
FIG. 1 is a side view in section, taken generally along line 1—1 in FIG. 2, of the water treatment and storage system of the present invention.

FIGS. 1, 2, and 3 illustrate the water treatment and storage system of the present invention, with the treated water storage arrangement being shown in section in FIGS. 1 and 3. The system includes a reverse osmosis treatment unit 10 having an untreated water input line 12, a treated water output line 14, and a bleed water output line 16. The treatment unit 10 receives untreated water via line 12, which is typically connected to the residential water service line.

Treatment unit 10, which may be any one of a number of known reverse osmosis units, provides treated water to line 14 from which a substantial portion of the salts and particulate contaminants have been removed. Such salts and particulate contaminants pass out of unit 10 through line 16, carried by the bleed water leaving the unit. Due to the relatively low flow rate of treated water supplied to line 14, it is desirable to store a quantity of treated water so that treated water may subsequently be supplied as needed to a dispensing device, such as a faucet, at a relatively high flow rate. Additionally, it is desirable that the stored water be maintained under pressure to permit treated water to be supplied to a dispensing device which is mounted at a level above that at which the water is stored.

Accordingly, in order to store the treated water under pressure, an expandable container means 18 is provided which defines an expandable storage chamber 20. Chamber 20 may typically be of a size sufficient to store approximately 1½ gallons. Container means 18 may preferably consist of an expandable bellows 22 formed of flexible plastic or other suitable material, and a substantially rigid plate 24 extending across and sealing the upper end of the bellows. Although bellows 22 is illustrated as being generally cylindrical in shape, it will be appreciated that other bellows arrangements having non-uniform diameters, such as a bellows which is configured in the shape of an hour glass, may be utilized.

A container valve means 26 connects the storage chamber 20 to the treated water output line 14 of the reverse osmosis treatment unit 10. As explained more fully below, the container valve means 26 permits flow of treated water to the storage chamber 20 when less than a predetermined quantity of treated water is stored in the storage chamber 20, and terminates the flow of treated water to the storage chamber 20 when the predetermined quantity of treated water has been accumulated therein.

In order to maintain the water in the chamber 20 under sufficient pressure for distribution through the treated water distribution line 28 to a dispensing unit, a spring means 30 is provided for applying a spring force to the expandable container means 18. The spring means 30 includes a support plate 32 which is secured to the container valve means 26. A pair of spring guide rods 34 are mounted on the support plate 32 on opposite sides of the expandable container means 18. A pressure bar 36 is slidably mounted on the spring guide rods 34 and contacts the side of the expandable container means 18 opposite the container valve means 26. Although pressure bar 36 is illustrated in FIG. 1 as being raised slightly above plate 24, it will be appreciated that, in operation of the storage arrangement, the bar 36 will be pressed against plate 24 by a pair of compression springs 38. Each of the compression springs 38 is mounted on an associated one of the guide rods 34 on the side of the pressure bar 36 opposite the expandable container means and applies a spring force to the bar 36 which is, in turn, applied to the expandable container means 18.

In practice, it is desirable that the treated water stored in chamber 20 be maintained under a pressure of between 4 and 8 psia. Springs 38 are therefore selected to provide sufficient downward force to bar 36 to maintain the water in chamber 20 within this pressure range. If, for example, an expandable bellows 22 having a 5 inch diameter is utilized, springs 38 are selected such that spring force of between 80 and 160 lbs. is applied to bar 36 over the range of bar movement on guide rods 34. It will be appreciated that other similar spring arrangements, incorporating a greater number of rods 34 and springs 38, spaced around the periphery of expandable container means 18, may also be utilized.

The container valve means 26 includes a valve body 40 consisting of an upper body portion 42, an intermediate body portion 44, and a lower body portion 46. Body portions 42, 44, and 46, are illustrated as being made of plastic, but it will be appreciated that the valve body may also be made of metal or any other suitable material. Valve body portions 42, 44, and 46, are threaded as illustrated, permitting them to be joined together, with O-ring 48 providing a seal at the interface between body portions 42 and 44 and the peripheral edge of diaphragm 50 providing a seal at the interface between body portions 44 and 46. Valve body portion 42 is seated within an opening in support plate 32 and may be attached to the plate 32.

Valve body 40 defines a treated water valve chamber 52, a treated water valve inlet 54 communicating between the treated water valve chamber 52 and the treated water output line 14, and a treated water valve outlet 56 communicating between the treated water valve chamber 52 and the expandable storage chamber 20. The treated water valve chamber 52 defines a valve seat 58 surrounding the treated water valve outlet 56.

Container valve means 26 further includes valve head means 60 positioned in the treated water valve chamber 52 and movable from a first position, in which the valve head means 60 contacts the valve seat 58 to prevent flow of treated water from the inlet 54 to the outlet 56, to a second position in which the valve head means 60 permits flow from the treated water inlet 54 to the treated water outlet 56. The valve head means 60 is shown in FIG. 1 at a position intermediate the first and second positions described above.

A linkage means, including stainless steel wire 62, connects the valve head means 60 and the expandable container means 18 and moves the valve head means from its second position into its first position when the predetermined quantity of treated water is stored in the storage chamber 20. Wire 62 is connected at one end to a valve stem portion 64 of valve head means 60. The opposite end of wire 62 is connected to attachment tab 66 which is secured to plate 24. When the storage chamber 20 is filled sufficiently, i.e., when a predetermined quantity of water has been accumulated within the chamber 20, plate 24 is raised such that wire 62 pulls valve head means 60 upward, causing a seat contacting portion 68 of the valve head means 60 to contact valve seat 58. A valve spring means including compression spring 70 is provided to urge the valve head means 60 toward its second position. This insures that the seat contacting portion 68 of valve head means 60 is held away from valve seat 58 when less than the predetermined quantity of treated water is stored in the storage chamber 20. Spring 70 preventing the valve head means 60 from being drawn upward into contact with the seat 58 by virtue of the flow of water from the chamber 52 into the outlet 56. The valve head means 60 further includes a plurality of feet 72 which extend from the seat contacting portion 68 on the side thereof opposite the valve seat 58 to contact the wall 74 of the chamber 52. Feet 72 limit movement of the valve head means 60 away from the valve seat 58.

The valve body 40 further defines a container outlet 76 which communicates between the treated water valve outlet 56 and the treated water distribution line 28. It should be noted that regardless of the position of valve head means 60 in valve chamber 52, the fluid flow path between the storage chamber 20 and line 28, via valve outlet 56 and container outlet 76, remains open. Thus the treated water stored in chamber 20 may be removed from the chamber at any time.

The container valve means 26 further comprises bleed valve means 78 which connects the bleed water output line 16 of the reverse osmosis treatment unit 10 to a drain line 80. Bleed valve means 78 allows bleed water to flow from the unit 10 to the drain line 80 when less than the predetermined quantity of treated water is stored in the storage chamber 20. When, however, the predetermined quantity of treated water has been accumulated in chamber 20, the flow of bleed water to the drain line 80 is terminated.

Valve body portions 44 and 46 define a bleed water valve chamber 82, a bleed water valve inlet 84 communicating between the bleed water valve chamber 82 and the bleed water output line 16 of the reverse osmosis treatment unit 10, and a bleed water valve outlet 86 communicating between the bleed water valve chamber 82 and drain line 80. A bleed valve closure means, including flexible diaphragm 50, is positioned in the bleed water valve chamber 82 for terminating flow of bleed water from the bleed water output line 16 of the reverse osmosis unit 10 to the drain line 80 when the predetermined quantity of treated water is stored in the storage chamber 20.

Flexible diaphragm 50 divides the bleed water valve chamber 82 into a first chamber portion 88 communicating with the bleed water inlet 84 and the bleed water valve outlet 86 and a second chamber portion 90. Diaphragm 50 is movable into contact with the bleed water valve inlet 84 so as to terminate flow of bleed water from the inlet 84 into the first chamber portion 88 of the valve chamber 82. In order to move diaphragm 50 into contact with inlet 84 to terminate the flow of bleed water to drain line 80, an opening 92 (FIG. 4) is defined in valve body portion 44. Opening 92 extends between the treated water valve chamber 52 and the second chamber portion 90 of the bleed water valve chamber 82. After the valve head means 60 has been drawn upward by wire 62 so as to terminate the flow of treated water from the chamber 52 into storage chamber 20 through outlet 56, the pressure within chamber 52 will gradually increase, pressing the diaphragm 50 downward into contact with bleed water valve inlet 84. Diaphragm 50 will then be held against inlet 84 by virtue of the larger surface area of the upper side of the diaphragm. It will be appreciated that diaphragm 50 will be held in this position until a quantity of treated water has been removed from the chamber 20.

In operation of the system, the reverse osmosis treatment unit provides a flow of treated water to the expandable storage chamber 20. The bellows 22 expands and moves the plate 24 upward against the opposing spring force provided by compression springs 38. When a predetermined quantity of treated water, sufficient to meet the intermittent usage requirements of the residence has been accumulated in the chamber 20, the plate 24 will have been raised sufficiently to pull the valve head means 60 upward, terminating flow of treated water into the chamber 20. As the pressure of the water in valve chamber 52 subsequently increases, diaphragm 50 is forced downward, terminating the flow of bleed water. It will be appreciated that no further water will be utilized by the reverse osmosis treatment unit 10 until a portion of the treated water stored in the chamber 20 is withdrawn. Thus water wastage is significantly reduced since water flow through unit 10 is provided only as required.

FIG. 5 illustrates an alternative spring means for applying a spring force to expandable container means 18 to maintain the treated water in storage chamber 20 under pressure. In this arrangement, a pressure plate means, including plate 94, is mounted on the support plate 32 (FIG. 1) by means of rods 96 and extends across expandable container means 18 on the side thereof opposite the container valve means 26. A compression spring 98 is received within recess 100 in rigid plate 24 and is compressed between plate 24 and plate 94. Recess 100 may, if desired, be annular in shape. Spring 98 applies a spring force to the expandable container means 18 which tends to urge plate 24 downward, maintaining the water in chamber 20 under pressure. It will be appreciated that still other spring arrangements may be utilized for the same purpose.

While the form of apparatus herein described constitutes a preferred embodiment of the invention, it is to be understood that the invention is not limited to this precise form of apparatus, and that changes may be made therein without departing from the scope of the invention.

What is claimed is:

1. An arrangement for storing treated water received from a reverse osmosis treatment unit of the type having a treated water output line and a bleed water output line separated by a reverse osmosis semipermeable membrane, and for maintaining the stored treated water under pressure, comprising:

expandable container means having a movable portion and defining an expandable storage chamber for storing treated water, container valve means, connecting said storage chamber to said treated water output line of said reverse osmosis treatment unit, for permitting flow of treated water to said storage chamber when less than a predetermined quantity of treated water is stored in said storage chamber, and for terminating said flow of treated water to said storage chamber when said predetermined quantity of treated water is stored in said storage chamber, said container valve means including mechanical linkage means connected to said movable portion of said container means for providing solely mechanical control of said container valve means, and pressure spring means for applying a spring force to said expandable container means to maintain said stored treated water in said storage chamber under pressure.

2. The arrangement of claim 1 in which said container valve means further comprises means defining a container outlet for permitting uninterrupted flow of treated water from said expandable container means to a treated water distribution line.

3. The arrangement of claim 1 in which said container valve means comprises a valve body defining a treated water valve chamber, a treated water valve inlet communicating between said treated water valve chamber and said treated water output line of said reverse osmosis treatment unit, and a treated water valve outlet communicating between said treated water valve chamber and said expandable storage chamber, said treated water valve chamber defining a valve seat surrounding said treated water valve outlet, and valve head means positioned in said treated water valve chamber and movable from a first position, in which said valve head means contacts said valve seat to prevent flow from said treated water inlet to said treated water outlet, to a second position, in which said valve head means permits flow from said treated water inlet to said treated water outlet, and in which said mechanical linkage means connects said valve head means and said expandable container means so as to move said valve head means from said second position into said first position when said predetermined quantity of treated water is stored in said storage chamber, whereby further flow of treated water to said storage chamber is terminated.

4. The arrangement of claim 3 in which said valve body further defines a container outlet communicating between said treated water valve outlet and a treated water distribution line, whereby uninterrupted flow from said expandable container means to said distribution line is provided.

5. The arrangement of claim 3 in which said valve head means comprises a seat contacting portion for contacting said valve seat when said valve head means is in said first position, and in which said container valve means further comprises valve spring means for urging said valve head means toward said second position, whereby said heat contacting portion is held away from said valve seat when less than said predetermined quantity of treated water is stored in said storage chamber.

6. The arrangement of claim 5 in which said valve head means further comprises a plurality of feet extending from said seat contacting portion on the opposite side thereof opposite said valve seat, for contacting the wall of said treated water valve chamber and limiting movement of said valve head means away from said valve seat.

7. The arrangement of claim 5 in which said mechanical linkage means comprises a wire connected to said valve head means and to said expandable container means such that said seat contacting portion is moved into contact with said valve seat against the opposing force of said valve spring means when said expandable container means has received said predetermined quantity of treated water in said storage chamber.

8. The arrangement of claim 7 in which said valve head means further comprises a valve stem portion, extending into said treated water valve inlet and connected to said wire.

9. The arrangement of claim 7 in which said expandable container means comprises an expandable bellows connected to said valve body and a substantially rigid plate extending across said bellows at the end thereof opposite said treated water valve outlet, said wire being attached to said substantially rigid plate.

10. The arrangement of claim 3 in which said valve body further defines a bleed water valve chamber, a bleed water valve inlet communicating between said bleed water valve chamber and said bleed water output line of said reverse osmosis treatment unit, and a bleed water valve outlet communicating between said bleed water valve chamber and a drain line, and in which said arrangement further comprises bleed valve closure means in said bleed water valve chamber for terminating flow of bleed water from said bleed water output line of said reverse osmosis unit to said drain line when said predetermined quantity of treated water is stored in said storage chamber.

11. The arrangement of claim 10 in which said bleed valve closure means comprises a flexible diaphragm in said bleed water valve chamber, dividing said bleed water valve chamber into a first chamber portion communicating with said bleed water valve inlet and said bleed water valve outlet and a second chamber portion, said diaphragm being movable into contact with said bleed water valve inlet so as to terminate flow of bleed water from said bleed water valve inlet into said first chamber portion of said bleed water valve chamber.

12. The arrangement of claim 11 in which said valve body further defines an opening extending between said treated water valve chamber and said second chamber portion of said bleed water valve chamber, whereby the increase in pressure in said treated water valve chamber upon movement of said valve head means into said first position produces movement of said diaphragm into contact with said bleed water valve inlet.

13. The arrangement of claim 1 in which said spring means comprises:

a plurality of spring guide rods attached to said container valve means and spaced around said expandable container means, a pressure bar slidably mounted on said spring guide rods and contacting the side of said expandable container means opposite said container valve means, and a plurality of compression springs, each of said compression springs mounted on an associated one of said spring guide rods on the side of said pressure bar opposite said expandable container means, whereby said compression springs urge said pressure bar against said expandable container means to maintain said stored treated water in said storage chamber under pressure.

14. The arrangement of claim 1 in which said spring means comprises:

pressure plate means attached to said container valve means and extending across said expandable container means on the side thereof opposite said container valve means, and a compression spring, contacting said expandable container means and said pressure plate means, whereby said compression spring applies a spring force to said expandable container means to maintain said stored treated water in said storage chamber under pressure.

15. The arrangement of claim 14 in which said expandable container means defines a recess in its outer surface for receiving one end of said compression spring.

16. The arrangement of claim 1 in which said container valve means further comprises bleed valve means, connecting said bleed water output line of said reverse osmosis treatment unit to a drain line, for permitting flow of bleed water from said unit to said drain line when less than said predetermined quantity of treated water is stored in said storage chamber and for terminating said flow of bleed water from said unit to said drain line when said predetermined quantity of treated water is stored in said storage chamber.

17. A water treatment and storage system, comprising:
a reverse osmosis treatment unit having an untreated water input line, a bleed water output line, and a treated water output line separated from said untreated water input line and said bleed water output line by a reverse osmosis semipermeable membrane
expandable container means having a movable portion and defining an expandable storage chamber for storing treated water,
container valve means, connecting said storage chamber to said treated water output line of said reverse osmosis treatment unit, for permitting flow of treated water to said storage chamber when less than a predetermined quantity of treated water is stored in said storage chamber, and for terminating said flow of treated water to said storage chamber when said predetermined quantity of treated water is stored in said storage chamber, said container valve means including mechanical linkage means connected to said movable portion of said container means for providing solely mechanical control of said container valve means, and
pressure spring means for applying a spring force to said expandable container means to maintain said stored treated water in said storage chamber under pressure.

18. The water treatment and storage system of claim 17 in which said container valve means further comprises means defining a container outlet for permitting uninterrupted flow of treated water from said expandable container means to a treated water distribution line.

19. The water treatment and storage system of claim 17 in which said container valve means comprises
a valve body defining a treated water valve chamber, a treated water valve inlet communicating between said treated water valve chamber and said treated water output line of said reverse osmosis treatment unit, and a treated water valve outlet communicating between said treated water valve chamber and said expandable storage chamber, said treated water valve chamber defining a valve seat surrounding said treated water valve outlet, and
valve head means positioned in said treated water valve chamber and movable from a first position, in which said valve head means contacts said valve seat to prevent flow from said treated water inlet to said treated water outlet, to a second position, in which said valve head means permits flow from said treated water inlet to said treated water outlet, and
in which said mechanical linkage means connects said valve head means and said expandable container means so as to move said valve head means from said second position into said first position when said predetermined quantity of treated water is stored in said storage chamber, whereby further flow of treated water to said storage chamber is terminated.

20. The water treatment and storage system of claim 19 in which said valve body further defines a container outlet communicating between said treated water valve outlet and a treated water distribution line, whereby uninterrupted flow from said expandable container means to said distribution line is provided.

21. The water treatment and storage system of claim 19 in which said valve head means comprises a seat contacting portion for contacting said valve seat when said valve head means is in said first position, and in which said container valve means further comprises valve spring means for urging said valve head means toward said second position, whereby said seat contacting portion is held away from said valve seat when less than said predetermined quantity of treated water is stored in said storage chamber.

22. The water treatment and storage system of claim 21 in which said valve head means further comprises a plurality of feet, extending from said seat contacting portion on the opposite side thereof opposite said valve seat, for contacting the wall of said treated water valve chamber and limiting movement of said valve head means away from said valve seat.

23. The water treatment and storage system of claim 21 in which said mechanical linkage means comprises a wire connected to said valve head means and to said expandable container means such that said seat contacting portion is moved into contact with said valve seat against the opposing force of said valve spring means when said expandable container means has received said predetermined quantity of treated water in said storage chamber.

24. The water treatment and storage system of claim 23 in which said valve head means further comprises a valve stem portion, extending into said treated water valve inlet and connected to said wire.

25. The water treatment and storage system of claim 23 in which said expandable container means comprises an expandable bellows connected to said valve body and a substantially rigid plate extending across said bellows at the end thereof opposite said treated water valve outlet, said wire being attached to said substantially rigid plate.

26. The water treatment and storage system of claim 19 in which said valve body further defines a bleed water valve chamber, a bleed water valve inlet communicating between said bleed water valve chamber and said bleed water output line of said reverse osmosis treatment unit, and a bleed water valve outlet communicating between said bleed water valve chamber and a drain line, and further comprising bleed valve closure means in said bleed water valve chamber for terminating flow of bleed water from said bleed water output line of said reverse osmosis unit to said drain line when said predetermined quantity of treated water is stored in said storage chamber.

27. The water treatment and storage system of claim 26 in which said bleed valve closure means comprises a flexible diaphragm in said bleed water valve chamber, dividing said bleed water valve chamber into a first chamber portion communicating with said bleed water valve inlet and said bleed water valve outlet and a second chamber portion, said diaphragm being movable into contact with said bleed water valve inlet so as to terminate flow of bleed water from said bleed water valve inlet into said first chamber portion of said bleed water valve chamber.

28. The water treatment and storage system of claim 27 in which said valve body further defines an opening extending between said treated water valve chamber and said second chamber portion of said bleed water valve chamber, whereby the increase in pressure in said treated water valve chamber upon movement of said valve head means into said first position produces movement of said diaphragm into contact with said bleed water valve inlet.

29. The water treatment and storage system of claim 17 in which said spring means comprises:
   a support plate secured to said container valve means,
   a pair of spring guide rods mounted on said support plate on opposite sides of said expandable container means,
   a pressure bar slidably mounted on said spring guide rods and contacting the side of said expandable container means opposite said container valve means, and
   a pair of compression springs, each of said compression springs mounted on an associated one of said spring guide rods on the side of said pressure bar opposite said expandable container means, whereby said compression springs urge said pressure bar against said expandable container means to maintain said stored treated water in said storage chamber under pressure.

30. The water treatment and storage system of claim 17 in which said container valve means further comprises bleed valve means, connecting said bleed water output line of said reverse osmosis treatment unit to a drain line, for permitting flow of bleed water from said unit to said drain line when less than said predetermined quantity of treated water is stored in said storage chamber and for terminating said flow of bleed water from said unit to said drain line when said predetermined quantity of treated water is stored in said storage chamber.

31. The arrangement of claim 17 in which said spring means comprises:
   pressure plate means attached to said container valve means and extending across said expandable container means on the side thereof opposite said container valve means, and
   a compression spring, contacting said expandable container means and said pressure plate means, whereby said compression spring applies a spring force to said expandable container means to maintain said stored treated water in said storage chamber under pressure.

32. The arrangement of claim 31 in which said expandable container means defines a recess in its outer surface for receiving one end of said compression spring.

* * * * *